(12) United States Patent
Chen

(10) Patent No.: US 8,132,437 B1  
(45) Date of Patent: Mar. 13, 2012

(54) BICYCLE LOCK

(75) Inventor: Mao-Yi Chen, New Taipei (TW)

(73) Assignee: Sinox Lock (Kushan) Co. Ltd., Xiangsu Province (CN)

(*) Notice: Subject to any disclaimer, the term of this patent is extended or adjusted under 35 U.S.C. 154(b) by 0 days.

(21) Appl. No.: 13/010,572

(22) Filed: Jan. 20, 2011

(51) Int. Cl.
B62H 5/00 (2006.01)

(52) U.S. Cl. .................. 70/233; 70/14; 70/30; 70/49

(58) Field of Classification Search ........... 70/14, 30, 70/49, 233
See application file for complete search history.

(56) References Cited

U.S. PATENT DOCUMENTS

| | | | | |
|---|---|---|---|---|
| 3,800,575 A * | 4/1974 | Perret, III | ............... | 70/233 |
| 3,910,602 A * | 10/1975 | Lindner | ............... | 224/427 |
| 4,023,387 A * | 5/1977 | Gould | ............... | 70/233 |
| 4,024,741 A * | 5/1977 | Arblaster | ............... | 70/233 |
| 4,028,916 A * | 6/1977 | Pender | ............... | 70/233 |
| 4,037,441 A * | 7/1977 | Ray | ............... | 70/233 |
| 4,051,703 A * | 10/1977 | Plaiss | ............... | 70/371 |
| 4,086,795 A * | 5/1978 | Foster et al. | ............... | 70/233 |
| 4,186,576 A * | 2/1980 | Means et al. | ............... | 70/233 |
| 4,870,843 A * | 10/1989 | Lundberg | ............... | 70/233 |
| 4,970,883 A * | 11/1990 | Johnson | ............... | 70/30 |
| 5,065,603 A * | 11/1991 | Kloke | ............... | 70/233 |
| 5,085,063 A * | 2/1992 | Van Dyke et al. | ............... | 70/218 |
| 5,251,464 A * | 10/1993 | Halter | ............... | 70/30 |
| 5,289,704 A * | 3/1994 | Johnson | ............... | 70/30 |
| 5,408,212 A * | 4/1995 | Meyers et al. | ............... | 340/427 |
| 5,473,917 A * | 12/1995 | Say | ............... | 70/49 |
| 5,513,508 A * | 5/1996 | Saunders et al. | ............... | 70/233 |
| 5,678,435 A * | 10/1997 | Hodson | ............... | 70/233 |
| 5,706,679 A * | 1/1998 | Zane et al. | ............... | 70/18 |
| 5,768,920 A * | 6/1998 | DeBevoise | ............... | 70/18 |
| 5,937,678 A * | 8/1999 | Kuo | ............... | 70/18 |
| 6,016,673 A * | 1/2000 | McDaid | ............... | 70/18 |
| 6,430,973 B1* | 8/2002 | Huang | ............... | 70/18 |
| 6,505,846 B1* | 1/2003 | Hoffman | ............... | 280/274 |
| 6,595,031 B2* | 7/2003 | Wilson et al. | ............... | 70/233 |
| 6,637,244 B2* | 10/2003 | Haraughty | ............... | 70/233 |
| 7,131,298 B1* | 11/2006 | Haraughty | ............... | 70/18 |
| 7,281,399 B2* | 10/2007 | Gagosz | ............... | 70/233 |
| 7,428,833 B2* | 9/2008 | Tollefson | ............... | 70/49 |
| 7,661,280 B1* | 2/2010 | Weyland | ............... | 70/233 |
| 7,784,313 B2* | 8/2010 | Wyers | ............... | 70/49 |
| 2010/0154492 A1* | 6/2010 | Ellis | ............... | 70/233 |

* cited by examiner

Primary Examiner — Suzanne Barrett  
(74) Attorney, Agent, or Firm — Schmeiser, Olsen & Watts LLP

(57) ABSTRACT

A bicycle lock comprises a handlebar union connecting a handlebar with a bicycle frame and having an insert hole; a lock mechanism built in the handlebar union and manipulated to have a lock state or an unlock state; and a cable with one end thereof connected with the handlebar union and another end thereof having a bolt. The cable can be wound around a fixed object. The bolt can be inserted into the insert hole and manipulated to a lock state via the lock mechanism to make the bolt neither disengage from the insert hole nor separate from the handlebar union.

9 Claims, 6 Drawing Sheets

BICYCLE LOCK

BACKGROUND OF THE INVENTION

1. Field of the Invention

The present invention relates to a bicycle lock, particularly to a bicycle lock built in a handlebar union.

2. Description of the Related Art

The lock has been an indispensable accessory for a bicycle to prevent from theft. The bicycle locks are usually in form of U-type locks and cable locks. Some manufacturers further design handsome and functional lock grippers to attach a lock to a bicycle. However, the bicycle lock is still only an accessory so far.

Since the lock is externally attached to the bicycle, it should risk theft and may drop from the bicycle.

SUMMARY OF THE INVENTION

The primary objective of the present invention is to provide a bicycle lock built in a handlebar union thereof, which neither drops nor outcrops from the bicycle, whereby is maintained esthetics of the bicycle.

To achieve the abovementioned objective, the present invention proposes a bicycle lock, which is skillfully built in a handlebar union. The bicycle lock of the present invention comprises a handlebar union connecting a bicycle handlebar with a bicycle frame and having an insert hole;

a lock mechanism built in the handlebar union and switched to have a lock state or an unlock state; and a cable with one end connected with the handlebar union and the other end having bolt, wherein the bolt can be inserted into the insert hole and switched to a lock state via the lock mechanism, whereby the bolt neither disengages from the insert hole nor drops out from the handlebar union.

The handlebar union has a receiving hole, whereby the cable can be inserted into the handlebar union via the receiving hole.

In another embodiment, the bicycle lock, which is built in a handlebar union, comprises a handlebar union connecting a bicycle handlebar with a bicycle frame and having an insert hole and a through-hole;

a lock mechanism built in the handlebar union and switched to have a lock state or an unlock state; and a cable, wherein one end of the cable has a head with an outer diameter greater than the diameter of the through-hole, and wherein the other end of the cable has a bolt able to pass through the through-hole, and wherein the bolt is inserted into the insert hole and switched to a lock state via the lock mechanism, whereby the bolt neither disengages from the insert hole nor drops out from the handlebar union.

In this embodiment, the handlebar has a cable accommodation room thereinside to receive the cable. The handlebar also has an opening at the end thereof, and the opening interconnects with the cable accommodation room, whereby the cable can be inserted into the cable accommodation room with the head exactly plugging the opening In a further embodiment, the bicycle lock, which is built in a handlebar union, comprises a lock mechanism built in a handlebar union and switched to have a lock state or an unlock state; and a cable, wherein one end of the cable has a pass-through hole, and wherein the other end of the cable has a bolt, and wherein the bolt is passed through the pass-through hole to form a closed loop and then inserted into an insert hole of a lock mechanism, and wherein the bolt is switched to a lock state via the lock mechanism, whereby the bolt neither disengages from the insert hole nor drops out from a handlebar union of the bicycle.

In this embodiment, one end of the cable has a sleeving member, and the pass-through hole is formed on the sleeving member; the end of the handlebar has an opening interconnecting with a cable accommodation room inside the handlebar, whereby the cable can be inserted into the cable accommodation room with the sleeving member exactly plugging the opening.

DETAILED DESCRIPTION OF THE INVENTION

Below, the contents of the present invention are described in detail with embodiments.

Figure 1:
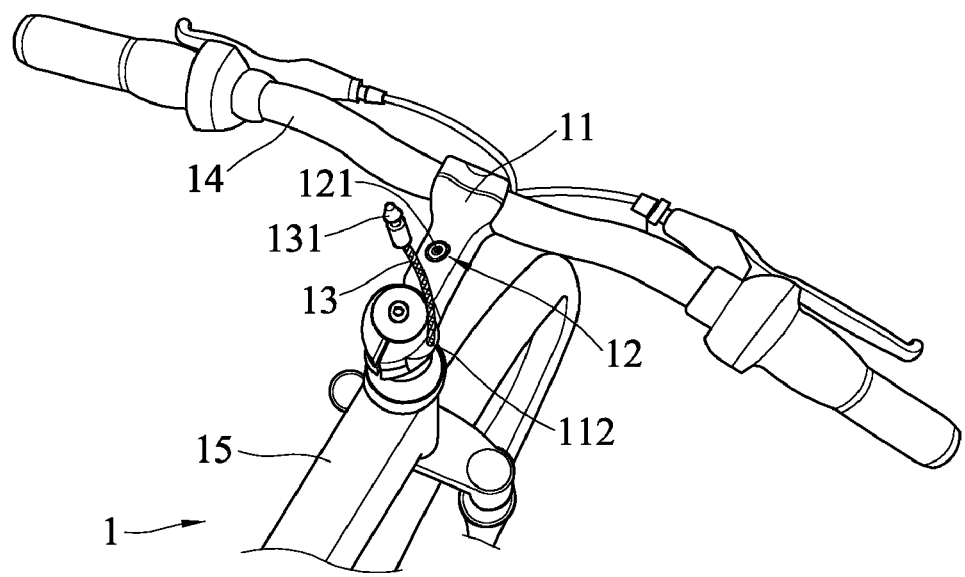
FIG. 1 is a diagram schematically showing a bicycle lock according to one embodiment of the present invention.
Figure 2A:
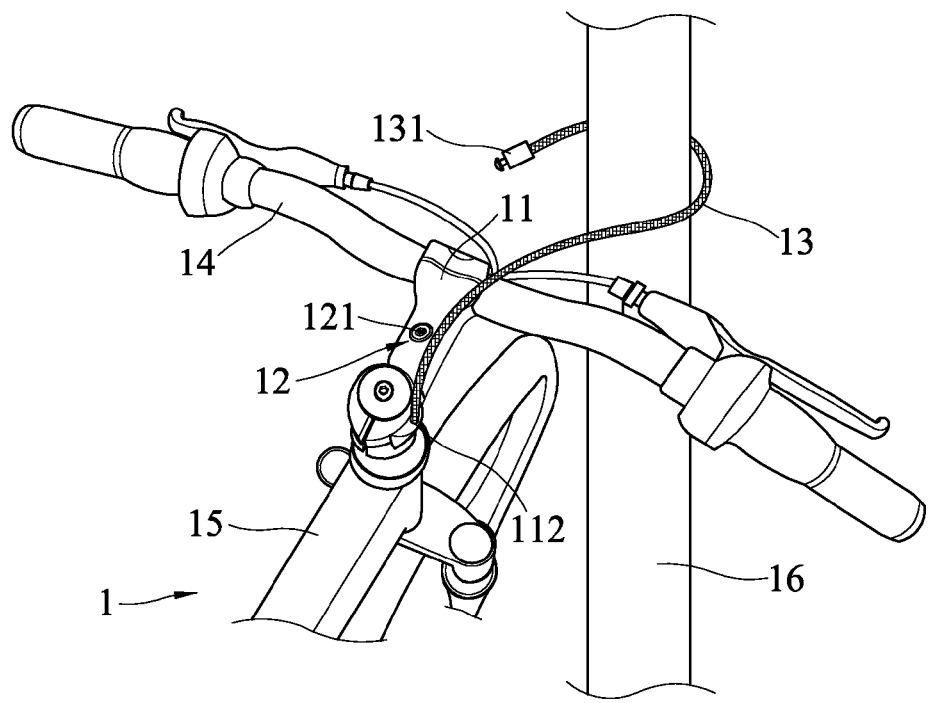
FIGS. 2A and 2B are diagrams schematically showing the operation of a bicycle lock according to the embodiment shown in FIG. 1.
Figure 2B:
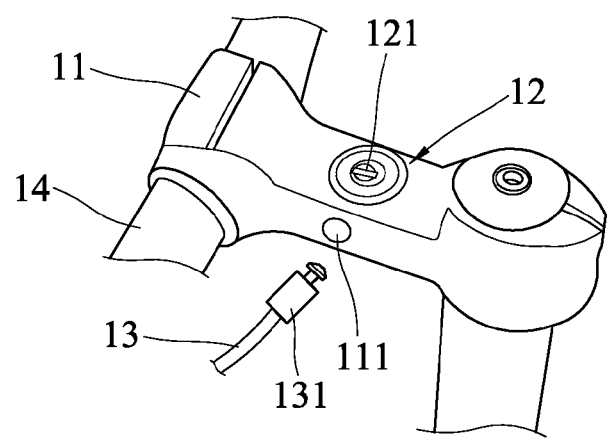

Refer to FIG. 1 and FIGS. 2A and 2B for a bicycle lock built in a handlebar union of a bicycle according to one embodiment of the present invention. In this embodiment, the bicycle lock is built in a handlebar union and comprises a handlebar union 11, a lock mechanism 12 and a cable 13. The handlebar union 11 is a necessary component of a bicycle 1 and used to connect a handlebar 14 with a bicycle frame 15. The handlebar union 11 has an insert hole 111.

The lock mechanism 12 is built in the handlebar union 11 and manipulated to have a lock state or an unlock state. The lock mechanism 12 shown in FIG. 1 and FIGS. 2A and 2B is a key-operated lock. The handlebar union 11 has a keyhole 121 into which the user inserts a key (not shown in the drawings) to switch the lock mechanism 12 to a lock state or an unlock state. In another embodiment, the lock mechanism 12 is a combination lock, which may be but is not limited to be manipulated by a dial or pressing keys.

The cable 13 is a flexible cable having arbitrary length. One end of the cable 13 is connected with the handlebar union 11, and the other end has a bolt 131.

Firstly, the user winds the cable 13 around a fixed object 16, such as an electric pole. Next, the bolt 131 is inserted into the insert hole 111 of the handlebar union 11. Then, the user manipulates the lock mechanism 12 into a lock state. Thereby, the bolt 131 neither disengages from the insert hole 111 nor drops out from the handlebar union 11. Thus, the bicycle 1 having the handlebar union 11 is fastened to the fixed object 16.

In this embodiment, the handlebar union 11 has a receiving hole 112 where the cable 12 is connected with the handlebar union 11. Via the receiving hole 112, the cable can be inserted into the handlebar union 11 and stored inside the handlebar union 11.

Figure 3:
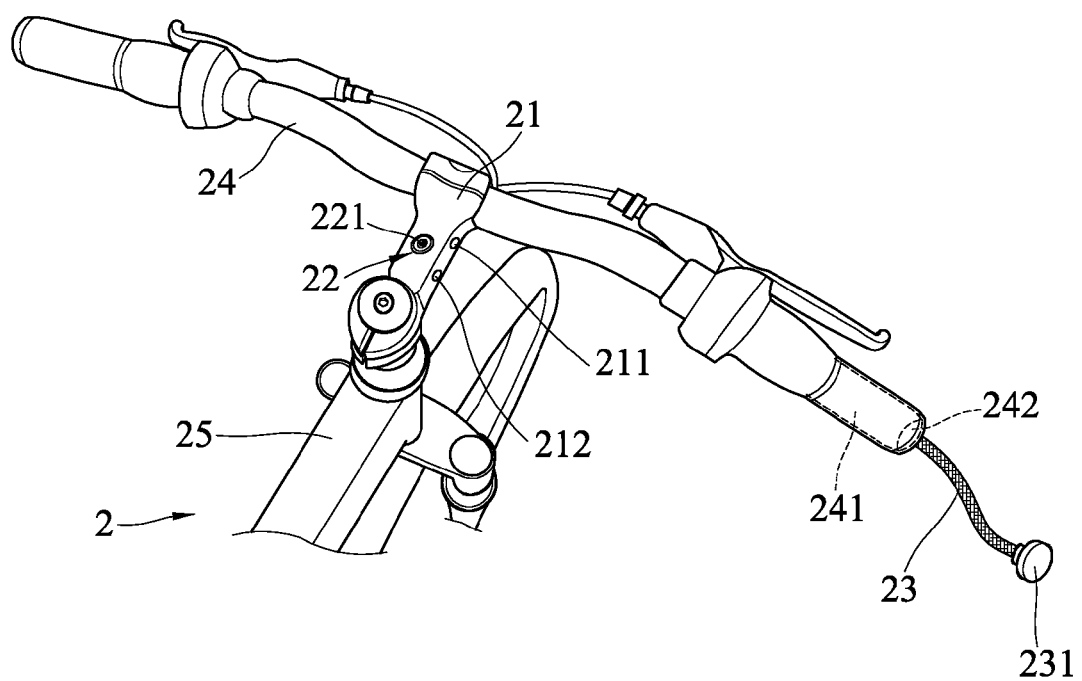
FIG. 3 is a diagram schematically showing a bicycle lock according to another embodiment of the present invention.
Figure 4:
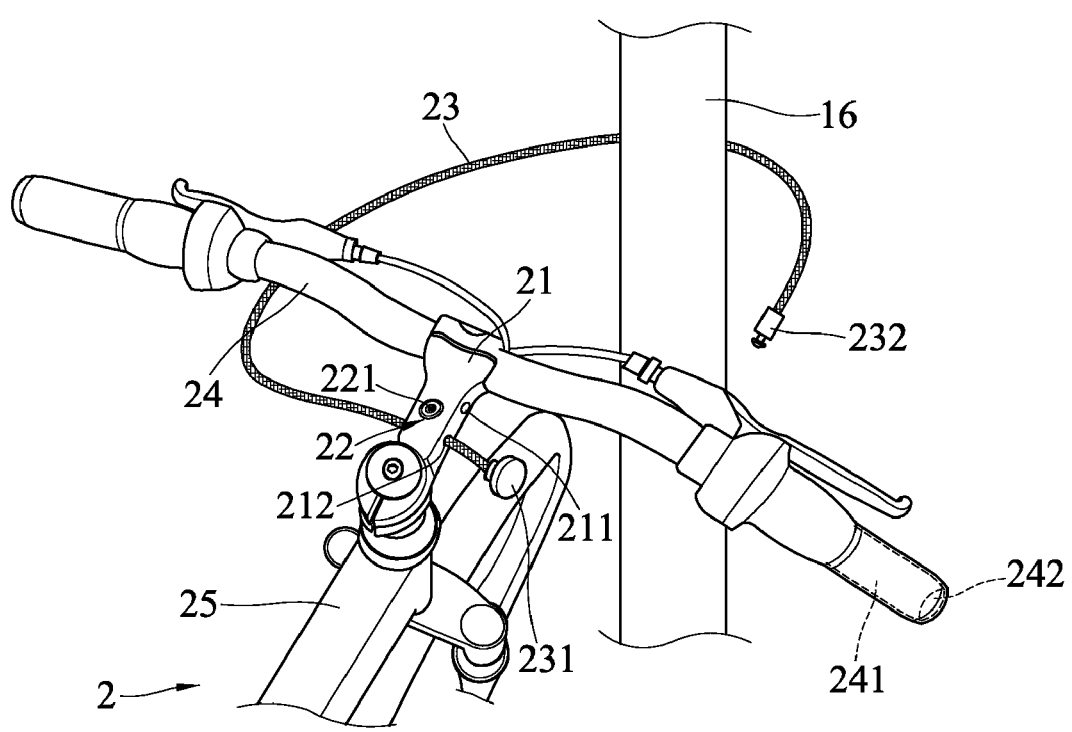
FIG. 4 is a diagram schematically showing the operation of a bicycle lock according to the embodiment shown in FIG. 3.

Refer to FIG. 3 and FIG. 4 for a bicycle lock according to another embodiment of the present invention. In this embodiment, the bicycle lock is built in a handlebar union and comprises a handlebar union 21, a lock mechanism 22 and a cable 23. The handlebar union 21 is a necessary component of a bicycle 2 and used to connect a handlebar 24 with a bicycle frame 25. The handlebar union 21 has an insert hole 211 and a through-hole 212.

The lock mechanism 22 is built in the handlebar union 21 and manipulated to have a lock state or an unlock state. The lock mechanism 22 shown in FIG. 3 and FIG. 4 is a key-operated lock. The handlebar union 21 has a keyhole 221 into which the user inserts a key (not shown in the drawings) to switch the lock mechanism 22 to a lock state or an unlock state. In another embodiment, the lock mechanism 22 is a combination lock, which may be but is not limited to be manipulated by a dial or pressing keys.

The cable 23 is a flexible cable having arbitrary length. One end of the cable 23 has a head 231 with an outer diameter greater than the diameter of the through-hole 212, and the other end of the cable 23 has a bolt 232 able to pass through the through-hole 212.

Firstly, the user inserts the bolt 232 through the through-hole 212. Next, the user winds the cable 23 around a fixed object 26, such as an electric pole. Next, the user inserts the bolt 232 into the insert hole 211 of the handlebar union 21. Then, the user manipulates the lock mechanism 22 into a lock state. Thereby, the bolt 232 neither disengages from the insert hole 211 nor drops out from the handlebar union 21. Thus, the bicycle 2 having the handlebar union 21 is fastened to the fixed object 26.

In this embodiment, the handlebar 24 has a cable accommodation room 241 thereinside. The handlebar 24 also has an opening 242 at the end thereof, and the opening 242 interconnects with the cable accommodation room 241. The cable 23 is inserted into the cable accommodation room 241 via the opening 242 and stored in the cable accommodation room 241. Meanwhile, the head 231 exactly plugs the opening 242 of the handlebar 24 and function as a cover of the opening 242.

Figure 5:
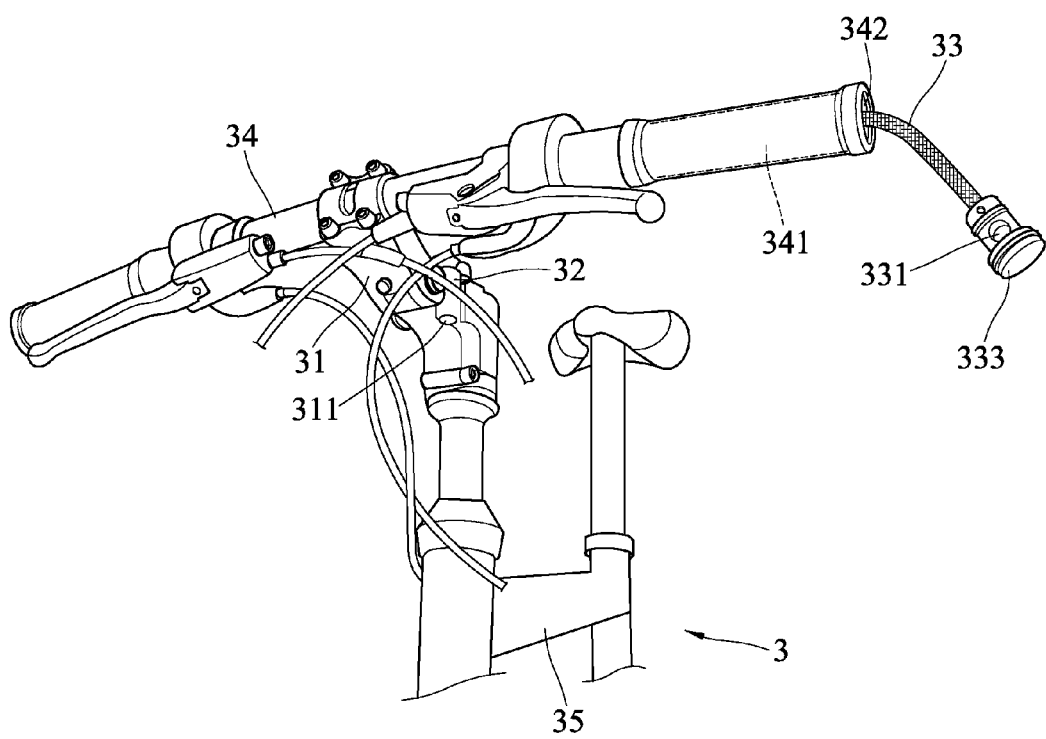
FIG. 5 is a diagram schematically showing a bicycle lock according to a further embodiment of the present invention.
Figure 6:
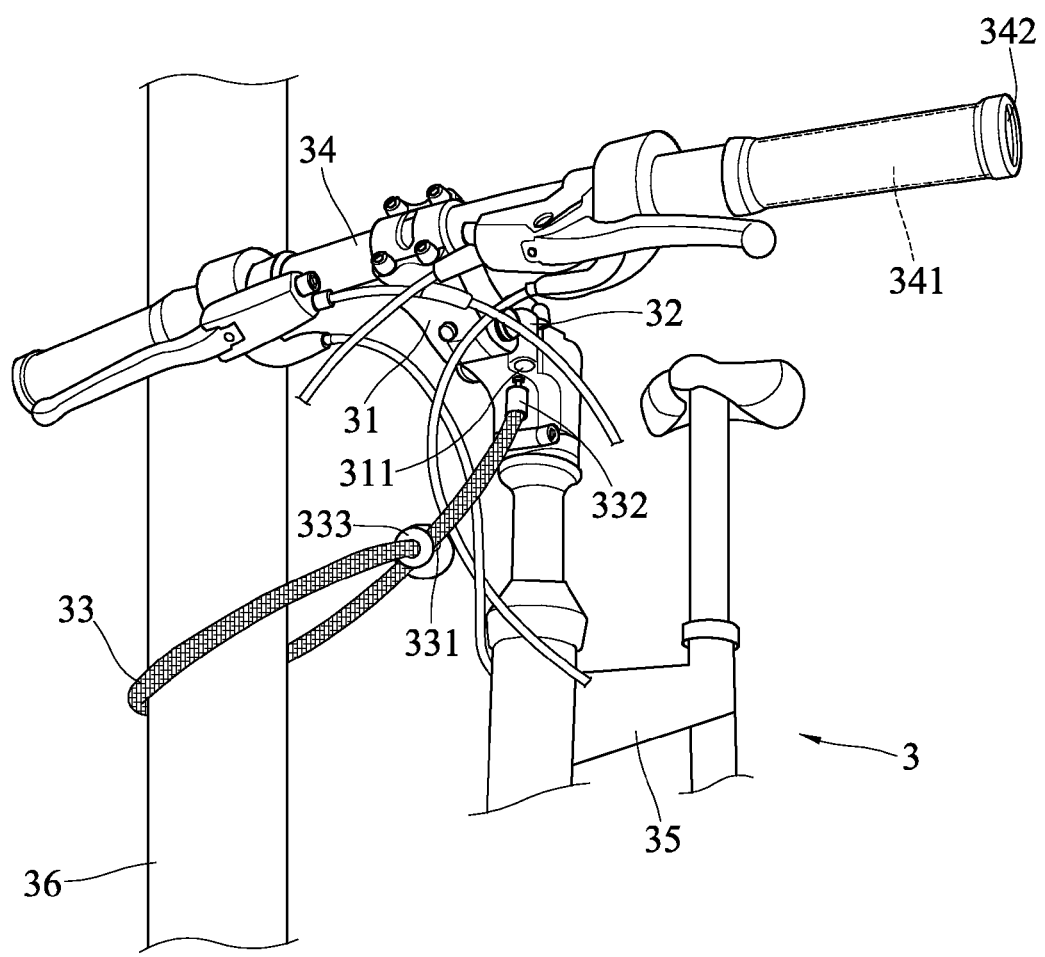
FIG. 6 is a diagram schematically showing the operation of a bicycle lock according to the embodiment shown in FIG. 5.

Refer to FIG. 5 and FIG. 6 for a bicycle lock according to a further embodiment of the present invention. In this embodiment, the bicycle lock is built in a handlebar union and comprises a handlebar union 31, a lock mechanism 32 and a cable 33. The handlebar union 31 is a necessary component of a bicycle 3 and used to connect a handlebar 34 with a bicycle frame 35. The handlebar union 31 has an insert hole 311.

The lock mechanism 32 is built in the handlebar union 31 and manipulated to have a lock state or an unlock state. The lock mechanism 32 shown in FIG. 5 and FIG. 6 is a key-operated lock. The handlebar union 31 has a keyhole (not shown in the drawings) into which the user inserts a key (not shown in the drawings) to switch the lock mechanism 32 to a lock state or an unlock state. In another embodiment, the lock mechanism 32 is a combination lock, which may be but is not limited to be manipulated by a dial or pressing keys.

The cable 33 is a flexible cable having arbitrary length. One end of the cable 33 has a pass-through hole 331, and the other end of the cable 33 has a bolt 332. The cable 33 has a sleeving member 333, and the pass-through hole 331 is formed on the sleeving member 333.

Firstly, the user winds the cable 33 around a fixed object 36, such as an electric pole. Next, the user passes the bolt 332 through the pass-through hole 331. Next, the bolt 332 is inserted into the insert hole 311. Then, the user manipulates the lock mechanism 32 into a lock state. Thereby, the bolt 332 neither disengages from the insert hole 311 nor drops out from the handlebar union 31. Thus, the bicycle 3 having the handlebar union 31 is fastened to the fixed object 36.

In this embodiment, the handlebar 34 has a cable accommodation room 341 thereinside. The handlebar 34 also has an opening 342 at the end thereof, and the opening 342 interconnects with the cable accommodation room 341. The cable 33 is inserted into the cable accommodation room 341 via the opening 342 and stored in the cable accommodation room 341. Meanwhile, the sleeving member 333 exactly plugs the opening 342 of the handlebar 34 and function as a cover of the opening 342.

In conclusion, the present invention proposes a bicycle lock, which is built in a handlebar union of a bicycle, and which neither drops nor outcrops from the bicycle but can keep the esthetics of the bicycle.

The embodiments described above are only to exemplify the present invention but not to limit the scope of the present invention. Any equivalent modification or variation according to the spirit of the present invention is to be also included within the scope of the present invention.

What is claimed is:

1. A bicycle lock comprising
a handlebar union connecting a handlebar with a bicycle frame and having an insert hole;
a lock mechanism built in said handlebar union and manipulated to have a lock state or an unlock state; and
a cable with one end thereof connected with said handlebar union and another end thereof having a bolt, wherein said bolt can be inserted into said insert hole and manipulated to a lock state via said lock mechanism to prevent said bolt from disengaging from said insert hole or separating from said handlebar union;
wherein the handlebar union has a receiving hole where the cable is connected with the handlebar union, the cable is inserted into the handlebar union and stored inside the handlebar union via the receiving hole.

2. The bicycle lock according to claim 1, wherein said lock mechanism is a key-operated lock, and said handlebar union has a keyhole.

3. A bicycle lock comprising
a handlebar union connecting a handlebar with a bicycle frame and having an insert hole and a through-hole;
a lock mechanism built in said handlebar union and manipulated to have a lock state or an unlock state; and
a cable with one end thereof having a head whose outer diameter is greater than a diameter of said through-hole and another end thereof having a bolt able to pass through said through-hole, wherein said bolt is inserted through said through-hole and then into said insert hole, and wherein said bolt is manipulated to a lock state via said lock mechanism to prevent said bolt from disengaging from said insert hole or separating from said handlebar union;
the handlebar has a cable accommodation room thereinside and an opening at one end thereof, the opening interconnects with the cable accommodation room, the cable is inserted into the cable accommodation room via the opening and stored in the cable accommodation room;
wherein said head can exactly plug said opening of said handlebar.

4. The bicycle lock according to claim 3, wherein said lock mechanism is a key-operated lock, and said handlebar union has a keyhole.

5. The bicycle lock according to claim 3, wherein said handlebar has a cable accommodation room to store said cable.

6. A bicycle lock comprising a handlebar union connecting a handlebar with a bicycle frame and having an insert hole;

a lock mechanism built in said handlebar union and manipulated to have a lock state or an unlock state; and a cable with one end thereof having a pass-through hole and another end thereof having a bolt, wherein said bolt is passed through said pass-through hole to form a closed loop and then inserted into said insert hole, and wherein said bolt is switched to a lock state via said lock mechanism to prevent said bolt from disengaging from said insert hole or separating from said handlebar union;

wherein the handlebar has a cable accommodation room thereinside and an opening at one end of the cable accommodation room, and the opening interconnects with the cable accommodation room;

wherein the cable is inserted into the cable accommodation room via the opening and stored in the cable accommodation room;

wherein the cable has a sleeving member, and the pass-through hole is formed on the sleeving member.

7. The bicycle lock according to claim 6, wherein said lock mechanism is a key-operated lock, and said handlebar union has a keyhole.

8. The bicycle lock according to claim 6, wherein said cable has a sleeving member, and said pass-through hole is formed on said sleeving member.

9. The bicycle lock according to claim 6, wherein said sleeving member can exactly plug said opening of said handlebar.

\* \* \* \* \*